(12) United States Patent
Power

(10) Patent No.: US 8,025,396 B1
(45) Date of Patent: Sep. 27, 2011

(54) MAGNETIC EYEWEAR LATCH MECHANISM

(75) Inventor: Hugh Power, Novato, CA (US)

(73) Assignee: Clic Goggles, Inc., Corte Madera, CA (US)

( * ) Notice: Subject to any disclaimer, the term of this patent is extended or adjusted under 35 U.S.C. 154(b) by 0 days.

(21) Appl. No.: 13/070,297

(22) Filed: Mar. 23, 2011

(51) Int. Cl.
*G02C 5/02* (2006.01)

(52) U.S. Cl. ............. 351/124; 351/129; 351/156; 2/445

(58) Field of Classification Search ................... 351/124, 351/125, 126, 127, 128, 129, 156; 2/445, 2/428, 15, 10
See application file for complete search history.

(56) References Cited

U.S. PATENT DOCUMENTS

| 5,110,198 | A * | 5/1992 | Travis et al. .................. 351/124 |
| 6,253,388 | B1 * | 7/2001 | Lando ............................... 2/445 |
| 6,611,959 | B1 * | 9/2003 | Lando ............................... 2/10 |
| 7,931,366 | B1 * | 4/2011 | Lando ........................... 351/156 |

\* cited by examiner

*Primary Examiner* — Hung Dang
(74) *Attorney, Agent, or Firm* — Bay Area Technology Law Group PC

(57) ABSTRACT

The present eyewear includes a pair of lenses, a pair of releasable connectors connected to respective inner ends of the lenses, a pair of temples pivotally connected to respective outer ends of the lenses and a rigid strap connected between rear ends of the temples. The strap is generally U-shaped having substantially parallel legs connected to an arc-shaped base, the substantially parallel legs being connected to rear ends of the temples and when worn, the arc-shaped base extends along the back of a user's head. A tab is permanently secured to one of the inner ends of the lenses or frames and upon joining the releasable connectors, extends to the other of the inner ends of the lenses or frames in order to stabilize the releasable connectors.

10 Claims, 2 Drawing Sheets

MAGNETIC EYEWEAR LATCH MECHANISM

TECHNICAL FIELD

The present invention deals with improved eyewear having a snap-together bridge feature.

BACKGROUND OF THE INVENTION

Applicant is the owner of U.S. Pat. No. 6,253,388. The invention disclosed and claimed in the '388 patent involved eyewear comprised of a pair of lenses generally secured within frames, releasable connectors connected to the respective inner ends of the lenses or frames, a pair of temples pivotable to the respective outer ends of the lenses or frames and a rigid strap attached between the rear ends of the temples. The strap was taught to be positioned below the lenses so as not to interfere with a hairdo or helmet. The inner ends of the lenses or frames were taught to be releasably secured together by the connectors, preferably, magnets. To position the eyewear, the lenses or frames are first separated from each other and pivoted outwardly. The strap is then wrapped around the back of a user's head and the lenses pivoted towards each other and secured together in the front of a user's eyes. The lenses or frames were taught to be instantly separable for easily putting on and taking off the eyewear, but are instantly connectable for a secure and accurate fit.

FIG. 1 depicts the eyewear generally disclosed and claimed in applicant's '388 patent. Specifically, lenses 10 were shown to be preferably mounted in respective frames 14 which are pivoted to temples 12. Connectors 11 are attached to respective inner ends of frames 14. Temples 12 are preferably telescoping for fitting different wearers. As noted, temples 12 were taught to be pivoted to the respective outer ends of frames connected to one another by strap 13, taught to be positioned below lenses 10 so as to avoid interfering with a hairdo or helmet and preferably springy enough to retain its shape when released, but also flexible enough to be bendable to some extent without breaking. Alternatively, strap 13 was taught to be at the same level as temples 12, but at a loss of some advantages. The disclosure of U.S. Pat. No. 6,253,388 is incorporated herein by reference.

In further reference to FIG. 1, it is noted that connectors, such as magnets 11, can be separated by torquing lenses 10 or their frames 14 in the direction of arrows 9. It has been found, however, that in certain instances such as those involving a larger than average head size or when frame 14 is constructed of a dense material, such as a precious metal, connectors, such as magnets 11, can inadvertently detach from one another requiring the user to push lenses 10 or frame 14 toward one another until magnets 11 reengage. As this can occur repeatedly, eventually, a user will tire of the process and discard the eyewear of FIG. 1 in favor of a more traditional fixed pair of glasses.

It is thus an object of the present invention to provide a latch system which substantially reduces inadvertent separation of lense or frame halves and yet provides for detachment of connectors when sought by a user.

These and further objects will be more readily apparent when considering the following disclosure and appended claims.

SUMMARY OF THE INVENTION

The present eyewear includes a pair of lenses, a pair of releasable connectors connected to respective inner ends of the lenses, a pair of temples pivotally connected to respective outer ends of the lenses and a rigid strap connected between rear ends of the temples. The strap is generally U-shaped having substantially parallel legs connected to an arc-shaped base, the substantially parallel legs being connected to rear ends of the temples and when worn, the arc-shaped base extends along the back of a user's head. A tab is permanently secured to one of the inner ends of the lenses or frames and upon joining the releasable connectors, extends to the other of the inner ends of the lenses or frames in order to stabilize the releasable connectors.

DETAILED DESCRIPTION OF THE INVENTION

Figure 1:
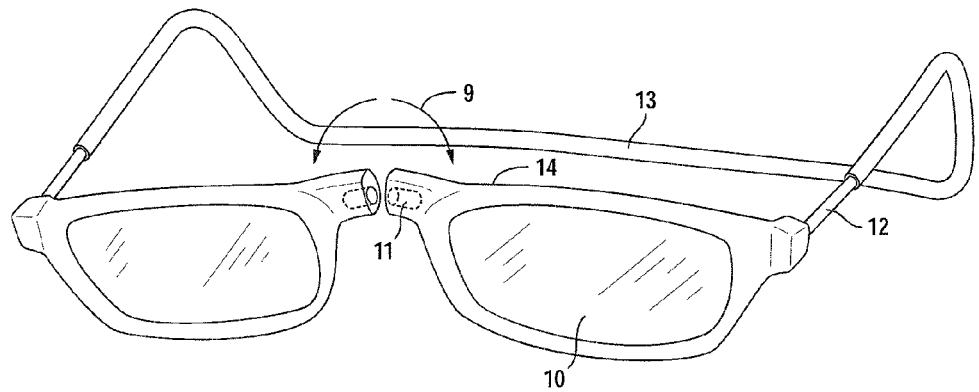
FIG. 1 is a perspective view of related prior art eyewear.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

As noted previously, applicant has taught in its U.S. Pat. No. 6,253,388, eyewear which includes lenses 10 mounted in respective frames 14. Connectors 11 are preferably attached to the inner ends of frames 14. Temples 12 are preferably telescopic for fitting different wearers. Lense or frame halves can be separated by torquing the halves away from one another shown graphically by arrows 9.

Figure 2:
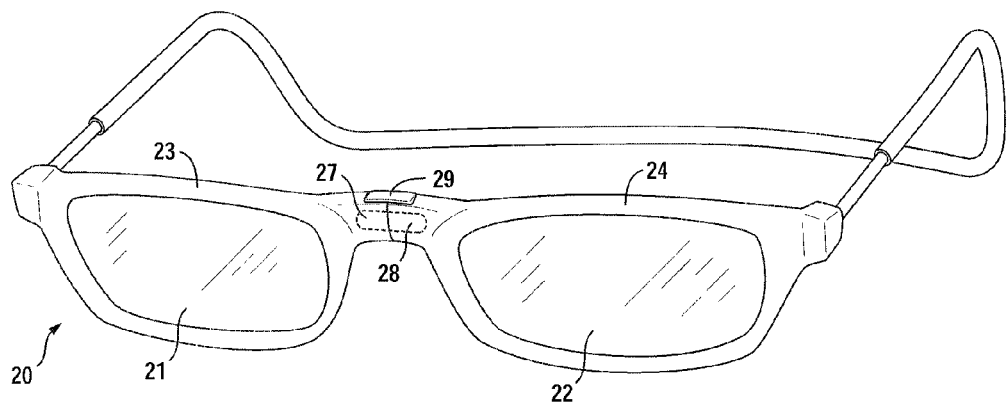
FIG. 2 is a perspective view of eyewear embodying the present invention.

In order to facilitate separation of lenses or frame halves only when a user wishes to positively engage in the process, reference is made to FIG. 2 showing frame halves 23 and 24 housing lenses 21 and 22 respectively connected at their inner ends 25 and 26 through the use of connectors 27 and 28, such as attracting magnets.

A key feature of the present invention is tab 29 permanently secured to one of the inner ends of the lenses or frame halves 24. When the lenses 21 and 22 or frame halves 23 and 24 are joined and releasably connected by interfacing connectors 27 and 28, tab 29 extends from frame half 24 to the other inner ends of frame half 23 as depicted in the drawings. Frame half 23 can include recess 35 sized to receive tab 29 to secure the connection and esthetically provide for a flat or horizontal bridge between frame halves 23 and 24.

Figure 4:
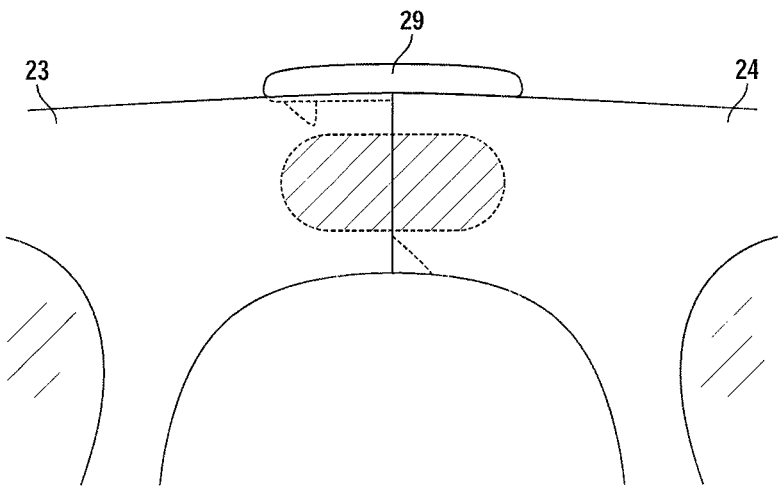
Figure 5:
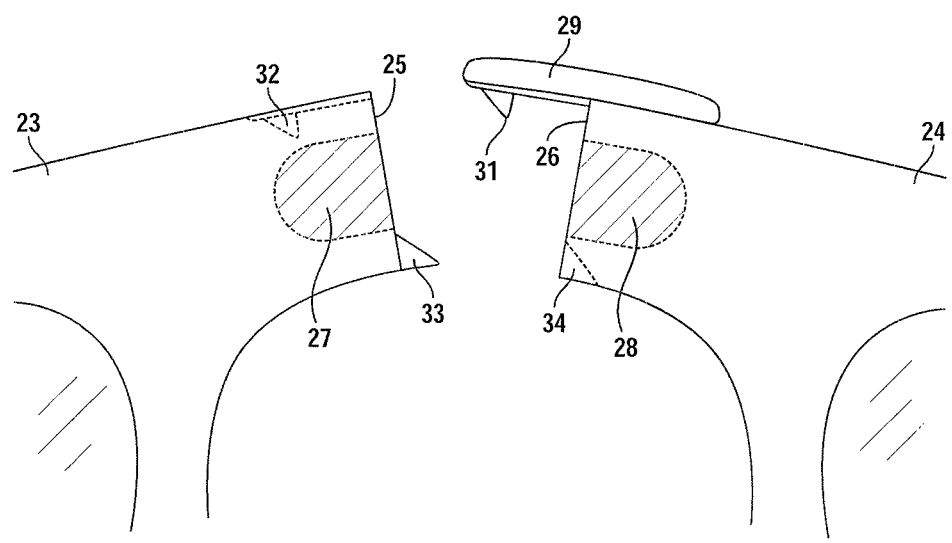

As a further preferred embodiment, reference is made to FIG. 5 noting that tab 29 further comprises projection 31 and further noting that frame 23 is provided with notch 32 which is sized and positioned such that when inner ends 25 and 26 of frame halves 23 and 24 are connected as shown in FIG. 4, projection 31 extends within notch 32 to further stabilize the connection.

Figure 3:
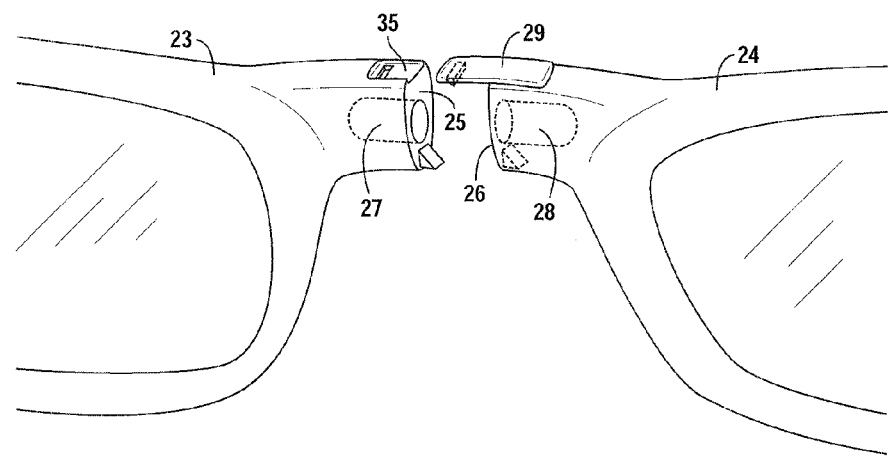
FIGS. 3-5 are front views of a portion of eyewear depicting the details of the present invention.

As yet a further preferred embodiment, reference is made to FIGS. 3 to 5 wherein frame half 23 further comprises protrusion 33 while complementary frame half 24 is provided with depression 34, the protrusion and depression configured within inner ends 25 and 26 of frame halves 23 and 24, respectively. When tab 29 extends from frame half 24 to frame half 23 and connectors 27 and 28 join, protrusion 33 enters depression 34 to further stabilize the sought after connection.

It is noted that when lenses 21 and 22 of frame halves 23 and 24 are to be separated such as by torquing sides of the eyewear in the direction of arrows 9, neither tab 29, projection 31 or protrusion 33 interferes with the separation process. Yet, it has been found that by providing these stabilizing elements in the form of this improved latch system, inadvertent separation is substantially avoided.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. Eyewear comprising:
   a pair of lenses;
   a pair of releasable connectors connected to respective inner ends of said lenses, said connectors being securely connectable together and releasable from each other;
   a pair of temples connected to respective outer ends of said lenses;
   a strap connected between rear ends of said temples, said strap being rigid enough to generally retain its shape when said connectors are released, and springy enough to be bendable when flexed and rebounding when released, said strap being generally U-shaped having substantially parallel legs connected to an arc-shaped base, said substantially parallel legs being connected to rear ends of said temples and when worn, said arc-shaped base extending along the back of a user's head; and
   a tab permanently secured proximate to one of the inner ends of said lenses and upon joining said releasable connectors, extending to the other of said inner ends of said lenses.

2. The eyewear of claim 1 wherein said connectors are comprised of magnets.

3. The eyewear of claim 1 wherein said temples are comprised of telescopic temples for fitting different wearers.

4. The eyewear of claim 1 wherein said temples are pivotally connected to said lenses, so that when said connectors are released from each other, said inner ends of said lenses are pivotable outward for making wearing easier.

5. The eyewear of claim 1 further including a pair of frames, said lenses being respectively mounted in said frames, said connectors being attached to respective inner ends of said frames, said tab permanently secured to one of the inner ends of said frames and upon joining said releasable connectors, extending to the other of said inner ends of said frames, said temples being attached to respective outer ends of said frames.

6. The eyewear of claim 5 wherein said tab further comprises a projection and said other of said inner ends of said frames is provided with a notch sized and positioned such that when the inner ends of said frames are connected, said projection extends within said notch.

7. The eyewear of claim 5 wherein one of the inner ends of said frame comprises a protrusion and the other of said inner ends of said frame is provided with a depression such that when the inner ends of said frame are connected, said protrusion extends within said depression.

8. Eyewear comprising:
   a pair of lenses;
   a pair of frames, said lenses being respectively mounted in said frames;
   a pair of releasable connectors connected to respective inner ends of said frames, said connectors being securely connectable together and releasable from each other;
   a pair of temples connected to respective outer ends of said frames;
   a strap connected between rear ends of said temples, said strap being rigid enough to generally retain its shape when said connectors are released, and springy enough to be bendable when flexed and rebounding when released, said strap being generally U-shaped having substantially parallel legs connected to an arc-shaped base, said substantially parallel legs being connected to the rear ends of said temples and when worn, said arc-shaped base extending along the back of a user's head; and
   a tab permanently secured proximate to one of the inner ends of said frames and upon joining said releasable connectors, extending to the other of said inner ends of said frames.

9. The eyewear of claim 8 wherein said tab further comprises a projection and the other of said inner ends of said frame is provided with a notch sized and positioned such that when the inner ends of said frame are connected, said projection extends within said notch.

10. The eyewear of claim 8 where in one of the inner ends of said frame comprises a protrusion and the other of said inner ends of said frame is provided with a depression such that when the inner ends of said frame are connected, said protrusion extends within said depression.

* * * * *